March 25, 1969   G. Y. BENZIES   3,434,181
APPARATUS FOR TENSIONING SHEET MATERIALS
Original Filed Oct. 1, 1962

INVENTOR
George Young Benzies
By Nolte & Nolte
Attorneys

United States Patent Office 3,434,181
Patented Mar. 25, 1969

3,434,181
APPARATUS FOR TENSIONING SHEET MATERIALS
George Y. Benzies, Woking, England, assignor to Vicker Aircraft Holdings Limited
Continuation of application Ser. No. 227,482, Oct. 1, 1962. This application Dec. 20, 1966, Ser. No. 603,390
Claims priority, application Great Britain, July 30, 1962, 29,233/62
Int. Cl. B28b *11/00;* B32b *31/04*
U.S. Cl. 18—19          2 Claims

ABSTRACT OF THE DISCLOSURE

An apparatus for producing mirrors from a thin flexible sheet of reflecting material is disclosed, wherein the sheet is placed over an annular trough having a substantially plane inner peripheral surface and an outer peripheral surface and the sheet is anchored along the outer peripheral surface. Thereupon the air is exhausted from the trough means so as to apply suction to and deflect the portion of the sheet between the inner and outer peripheral surfaces and thereby impart uniform tension to the portion of the sheet bounded by the inner peripheral surface. Finally a frame is secured to the tensioned portion of the sheet.

---

This application is a continuation of application Ser. No. 227,482, filed Oct. 1, 1962, and now abandoned.

The invention is concerned with the manufacture of mirrors in which a flat reflecting surface is produced by applying tension to a sheet of metallised film or foil material, and its object is to provide improved tensioning means whereby it is possible to produce reflectors which possess optical flatness and which will be acceptable as an alternative to conventional silvered glass mirrors.

The invention provides apparatus for tensioning a sheet of film or like material, e.g., for the purpose of manufacture of a mirror, comprising means for supporting the sheet in a substantially flat condition, means for anchoring the sheet at opposite edges and means for applying pneumatic suction to a face of the sheet along one or more selected zones thereof, e.g., a peripheral zone thereof, so that the resultant lateral deflection of the sheet in said zone or zones is effective to impart uniform tension to the part or parts of the sheet bounded by said zone or zones.

Apparatus for tensioning a sheet of film or the like material in accordance with the invention, e.g., for the aforesaid purpose, comprises an annular base, means associated with said annular base forming a continuous trough along the inner boundary thereof, and means for applying pneumatic suction to the interior of said trough, the arrangement being such that, a sheet of said material having been secured about said annular base so that it spans and entirely covers the said trough, the effect of exhausting the space enclosed within the trough and the subjacent face of the sheet of material is to impose substantially uniform tension in the part of the sheet of which the inner wall of the trough forms the periphery.

A mirror frame prepared to receive the tensioned sheet may be placed in contact therewith and suitably attached thereto to form a rigid mirror.

Figure 1:
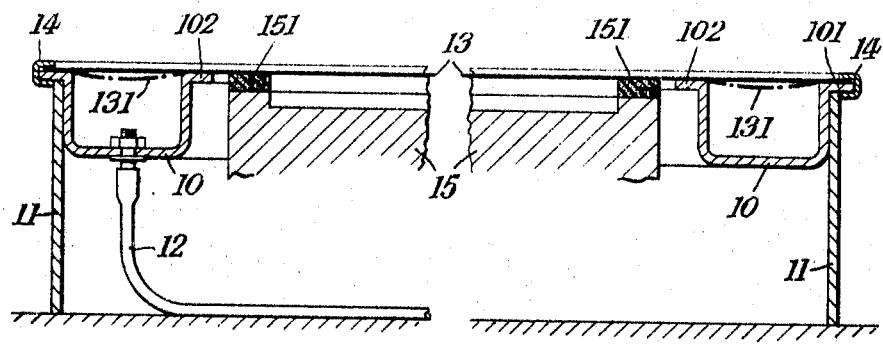
Figure 2:
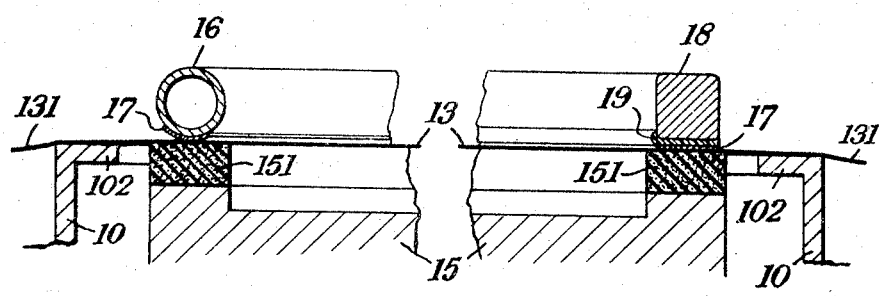

The manner in which the invention may be carried into effect is hereinafter described with reference to the accompanying diagrammatic drawings, in which FIG. 1 is a cross-section of the tensioning apparatus showing the reflecting film under tension, whilst FIG. 2 illustrates two alternative methods of attachment of the film to a frame.

The apparatus illustrated in FIG. 1 takes the form of an annular metal trough 10, which is fashioned with outer and inner flanges, respectively indicated at 101 and 102, the outer flange 101 being used to support the trough upon a stand 11. The said flanges are preferably machined so that their upper faces are truly planar, and the face of the flange 102 may be coplanar with that of the flange 101. The structure of the trough is sufficiently stout to enable the outer flange 101 to serve as the annular base which is one of the characteristic features of the invention. A pipe connection 12 is fixed in the base of the trough, as shown at the left hand side of FIG. 1, to enable a source of pneumatic suction to be coupled to the interior of the trough.

In use a sheet 13 of metallised film or foil material (e.g. the transparent polyester film which is sold under the registered trademark "Melinex," having a metallic coating on one face) is placed with metallised side facing upwards, across the annular base so that it lies in contact with the flanges 101, 102 as shown by the full lines in FIG. 1. The edge of the sheet 13 is secured in substantially flat condition to the outer edge of the flange 101 by means of a strip 14 of suitable adhesive tape or like material. Suction is then applied at 12 and the trough 10 is exhausted to a low pressure, with the result that the parts 131 of the sheet 13 which span the trough 10 are subjected to a suctional effect by which it is constrained to occupy the position shown in chain-dotted line. In consequence the sheet is subjected to substantially uniform tension over the whole of the area thereof which peripherally bounded by the flange 102. By reason of the planar condition of said flange 102 the region thus tensioned assumes the requisite optical flatness.

The mirror frame is placed in contact with the upper surface of the tensioned part of the sheet 13 and attached thereto before tension is relaxed. For this purpose a suitable support 15 is placed beneath the sheet, and means are conveniently provided whereby said support 15 may be raised very slightly above the plane of the flange 102 as the frame is applied. Such support 15 may be provided with an underlay 151 of sponge rubber or the like resilient material. In an alternative arrangement the inner flange 102 may itself be adapted to serve as a rigid support for the mirror frame during the step of affixing the latter to the sheet 13.

The left-hand side of FIG. 2 illustrates the mode of attachment to the reflecting sheet of a frame 16 of tubular construction. In this case adhesion of the sheet 13 to the frame is achieved by means of a strip 17 of double-sided adhesive tape, one face of which is affixed to the frame before applying the latter to the sheet. When adhesion is complete, the suction at the trough is released, the holding tape 14 is removed and the margin of the sheet 13 is further secured about the frame tube by means of a suitable metal, plastic or other edging strip, the excess material being trimmed off.

The right-hand side of FIG. 2 illustrates the mode of attachment to the reflecting sheet of a frame 18 of rectangular cross-section. It will be understood that the face of the frame to which the sheet 13 is affixed must be truly planar and a conveniently simple and inexpensive method of ensuring such planarity consist in applying to the face of the frame a quantity of a suitable polyester thermosetting resin and then placing the frame with the coated face downwards upon a surface table or plate to which a release agent has been applied. The resin must be one which does not expand or shrink on setting, such as the preparation sold as "Bakelite" 17449 with Catalyst 17438. A suitable release agent is the silicone wax polish sold under the trademark "Voltas." The frame is left in position until the resin has set whereafter it is removed and any sharp edges of solidified resin are smoothed away by filing. In FIG. 2 the resin body, which has been flattened as described, is indicated at 19.

What is claimed is:

1. Apparatus for tensioning a portion of a sheet of film to a required optical flatness comprising: a continuous annular trough having continuous inner and outer open, top, flat, flanged peripheral surfaces, said peripheral surfaces being substantially coplanar, means for anchoring the sheet along said outer peripheral surface, and means for exhausting the air in said trough to apply suction to and deflect the portion of the sheet between said inner and outer peripheral surfaces and impart uniform tension to that portion of the sheet which is bounded by said peripheral surfaces and thereby cause said portion of the sheet to assume the requisite optical flatness within the continuous inner surface.

2. The apparatus of claim 1, including support means situated within the space bounded by the inner peripheral surface of said trough for supporting the underside of the tensioned sheet when affixing an annular frame to the upper side of said sheet, said support means comprising an annulus of resilient material at spaced apart locations.

References Cited

UNITED STATES PATENTS

| | | | |
|---|---|---|---|
| 3,042,974 | 7/1962 | Gerstenmaier et al. | 18—19 |
| 3,214,314 | 10/1965 | Rowbottam | 156—229 |
| 3,073,268 | 1/1963 | Cole | 156—285 |
| 3,154,453 | 10/1964 | Demke et al. | 156—212 |

ROBERT F. BURNETT, *Primary Examiner.*

WILLIAM J. VAN BALEN, *Assistant Examiner.*

U.S. Cl. X.R.

18—1; 156—160, 285; 264—90, 229

PO-1050
(5/69)

UNITED STATES PATENT OFFICE
CERTIFICATE OF CORRECTION

Patent No. 3434181      Dated March 25, 1969

Inventor(s) George Y. Benzies

It is certified that error appears in the above-identified patent and that said Letters Patent are hereby corrected as shown below:

The assignee thereof, as shown in the heading should be the following:

BRITISH AIRCRAFT CORPORATION LIMITED

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents